US012762147B2

(12) United States Patent
Hallur et al.

(10) Patent No.: US 12,762,147 B2
(45) Date of Patent: Oct. 13, 2026

(54) DATA SYNCHRONIZATION ACROSS PLATFORMS

(71) Applicant: Capital One Services, LLC, McLean, VA (US)

(72) Inventors: Jayanna Chandrashekar Hallur, Henrico, VA (US); Aalishaben Torania, Henrico, VA (US); Samyog Lamsal, Ashburn, VA (US); Danny Lam Luong, Springfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/037,320

(22) Filed: Jan. 27, 2025

(65) Prior Publication Data

US 2026/0220155 A1 Jul. 30, 2026

(51) Int. Cl.
*G06F 16/00* (2019.01)
*G06F 16/27* (2019.01)

(52) U.S. Cl.
CPC .................................... *G06F 16/27* (2019.01)

(58) Field of Classification Search
CPC ....................................................... G06F 16/27
See application file for complete search history.

(56) References Cited

U.S. PATENT DOCUMENTS 6,295,541 B1 * 9/2001 Bodnar ................. G06F 16/275 707/999.203
11,544,284 B2 1/2023 Horowitz et al.
11,755,380 B1 * 9/2023 Goulet ................... G06Q 10/10 709/203
11,907,168 B2 2/2024 Prahlad et al.
2012/0185434 A1 * 7/2012 Giampaolo ........... G06F 16/178 707/634
2013/0085992 A1 * 4/2013 Prasad .................... G06F 16/27 707/634
2013/0218837 A1 * 8/2013 Bhatnagar ............. G06F 16/178 707/624
2014/0095929 A1 * 4/2014 Chan ................... G06F 11/1438 714/20
2014/0379359 A1 * 12/2014 Basey .................... G16H 30/20 705/2
2019/0354540 A1 * 11/2019 Stigsen ...................... G06F 7/14
2020/0334264 A1 * 10/2020 Lewis ...................... H04L 67/12
2022/0229849 A1 * 7/2022 Stigsen ...................... G06F 7/14
2023/0315757 A1 * 10/2023 DiPalma ............... G06F 16/275 707/611
2024/0028371 A1 * 1/2024 Luthra .................... G06F 9/461

* cited by examiner

*Primary Examiner* — Alexander Khong
(74) *Attorney, Agent, or Firm* — Harrity & Harrity, LLP

(57) ABSTRACT

In some implementations, a device may detect an event associated with performing data synchronization. The device may fetch a plurality of datasets, each dataset having a plurality of data entries. The device may cross-correlate data entries to generate a single merged dataset. The device may identify at least one group of data entries for which there is a discrepancy with respect to a data entry. The device may identify a source of truth for resolving the discrepancy. The device may resolve the discrepancy and identify a value for the data entry. The device may update the single merged dataset to include the value for the data entry. The device may publish the single merged dataset to a configuration management database that is accessible to the plurality of data platforms.

20 Claims, 6 Drawing Sheets

DATA SYNCHRONIZATION ACROSS PLATFORMS

BACKGROUND

An automated paging system, such as for an incident or event management system, may provide on-call support for a system. For example, when a system error is detected and/or an issue is identified, the automated paging system may transmit a paging message to a client device, such as a client device used by an engineer. Based on receiving the paging message, the engineer may use the client device to view and resolve the system error or the issue. To identify a client device to which to transmit a paging message, the paging system may access a database storing information identifying application teams, application personnel, managers, or other relevant data. In some cases, the database may have incomplete information. For example, a first database may store information relating to a system being managed, such as which engineers provide on-call support for the system, and a second database may store human resources information, such as information identifying contact information for engineers within an organization.

SUMMARY

Some implementations described herein relate to a system for data synchronization. The system may include one or more memories and one or more processors communicatively coupled to the one or more memories. The one or more processors may be configured to detect an event associated with performing data synchronization. The one or more processors may be configured to fetch, from a plurality of data platforms, a plurality of datasets, each dataset having a plurality of data entries. The one or more processors may be configured to cross-correlate data entries, from the plurality of datasets, to generate a single merged dataset. The one or more processors may be configured to identify at least one group of data entries, of the single merged dataset, for which there is a discrepancy with respect to a data entry. The one or more processors may be configured to identify, based on other data entries within the at least one group of data entries, a source of truth for resolving the discrepancy. The one or more processors may be configured to communicate with a client device associated with the source of truth to resolve the discrepancy and identify a value for the data entry. The one or more processors may be configured to update the single merged dataset to include the value for the data entry. The one or more processors may be configured to publish the single merged dataset to a configuration management database that is accessible to the plurality of data platforms.

Some implementations described herein relate to a non-transitory computer-readable medium that stores a set of instructions. The set of instructions, when executed by one or more processors of a system, may cause the system to detect an event associated with performing data synchronization. The set of instructions, when executed by one or more processors of the system, may cause the system to fetch, from a plurality of data platforms, a plurality of datasets, each dataset having a plurality of data entries. The set of instructions, when executed by one or more processors of the system, may cause the system to merge data entries, from the plurality of datasets, to generate a single merged dataset. The set of instructions, when executed by one or more processors of the system, may cause the system to identify at least one group of data entries, of the single merged dataset, for which there is a discrepancy with respect to a data entry. The set of instructions, when executed by one or more processors of the system, may cause the system to predict a value for the data entry based on the single merged dataset. The set of instructions, when executed by one or more processors of the system, may cause the system to update the single merged dataset to include the value for the data entry. The set of instructions, when executed by one or more processors of the system, may cause the system to publish the single merged dataset to a configuration management database that is accessible to the plurality of data platforms.

Some implementations described herein relate to a method. The method may include detecting, by a device, an event associated with performing data synchronization. The method may include fetching, by the device and from a plurality of data platforms, a plurality of datasets, each dataset having a plurality of data entries. The method may include cross-correlating, by the device, data entries, from the plurality of datasets, to generate a single merged dataset. The method may include identifying, by the device, at least one group of data entries, of the single merged dataset, for which there is a discrepancy with respect to a data entry. The method may include identifying, by the device and based on other data entries within the at least one group of data entries, a source of truth for resolving the discrepancy. The method may include resolving, by the device and using the source of truth, the discrepancy and identify a value for the data entry. The method may include updating, by the device, the single merged dataset to include the value for the data entry. The method may include publishing, by the device, the single merged dataset to a configuration management database that is accessible to the plurality of data platforms.

DETAILED DESCRIPTION

Figure 1A:
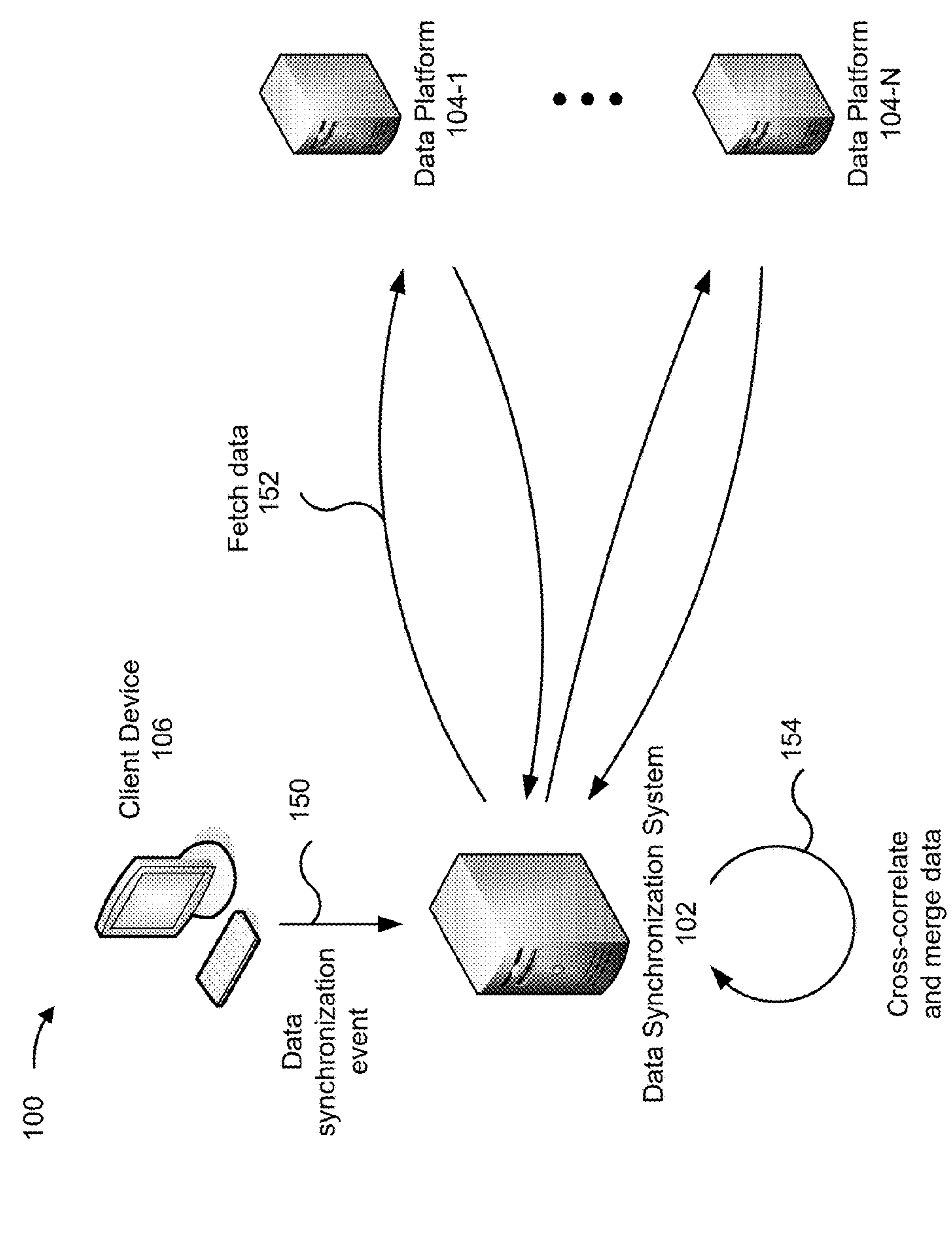
FIGS. 1A-1C are diagrams of an example implementation associated with data synchronization across platforms, in accordance with some embodiments of the present disclosure.

The following detailed description of example implementations refers to the accompanying drawings. The same reference numbers in different drawings may identify the same or similar elements.

Enterprise computing solutions may include many component systems, such as incident management systems, alert notification systems, enterprise application metadata systems, event management systems, or mass notification systems, among other examples. Large enterprises may support hundreds or thousands of applications via the component systems. Each component system may have access to different databases or other types of data structures storing relevant information. For example, data structures may store information identifying application teams, application team leads, application team managers, escalation policies, on-call personnel, or other information relating to resilient exercise results. Different information may be divided among different data structures or databases as a result of legacy decentralization of information input. In other words, rather than having a single database storing all information for an organization, different units of the organization may use different databases that have had information added at different times and with differing levels of reliability (e.g., accuracy).

During an incident, such as a detected system error, a large-scale event, an emergency, or another scenario, different independent teams, applications, or systems may work together to resolve the incident. However, each team, application, or system may only have access to a corresponding database or data structure providing incomplete information to enable resolution of an incident. For example, a pager system may have access to a database storing information associated with paging alert notifications and information identifying on-call support personnel. However, the pager system may not have access to information identifying an application team name, an application team lead, or an application team manager. Similarly, an incident management system may have access to information regarding incidents, associated application team names, or escalation policies, but may lack information identifying application leads, application managers, or on-call personnel. Similarly, an event management system, used for resiliency exercises, may have information identifying application names, application team leads, or other information related to the resiliency exercises, but may lack information identifying escalation policies, application team managers, or on-call support team members. Finally, a configuration management database (CMDB) may have information identifying all applications supported by an organization as well as information identifying application team leads, application team managers, or other application details. However, the CMDB may lack information identifying on-call personnel or escalation policies.

As a result, an organization may have difficulty automating incident detection, messaging, and resolution, which may result in an excessively high mean time to detect (MTTD) and/or an excessively high mean time to resolution (MTTR). This may result in system errors persisting for excessive periods of time, resulting in poor system performance and/or poor user experience. It is therefore desirable to generate a merged dataset that correlates data entries across different component datasets and to provide the merged dataset to permit systems to automatically perform tasks relating to incident or error management or resolution.

Some implementations described herein enable merging of data entries from multiple data structures. As a result, a data synchronization system can generate a merged dataset with information available to applications or systems to enable MTTD and/or MTTR reduction. For example, the data synchronization system may cross-correlate data entries across datasets to generate a merged dataset and may automatically resolve discrepancies that are identified in the merged dataset. In this case, the data synchronization system may identify a source of truth for a data entry associated with a discrepancy and may use the source of truth to determine an authoritative value for the data entry. Additionally, or alternatively, the data synchronization system may use machine learning or artificial intelligence to predict a value for a data entry associated with a discrepancy. In this way, when a dataset is used to respond to an incident or event, the dataset is complete and accurate, thereby enabling a system to perform a set of automated tasks to respond to the incident or event.

Figure 1B:
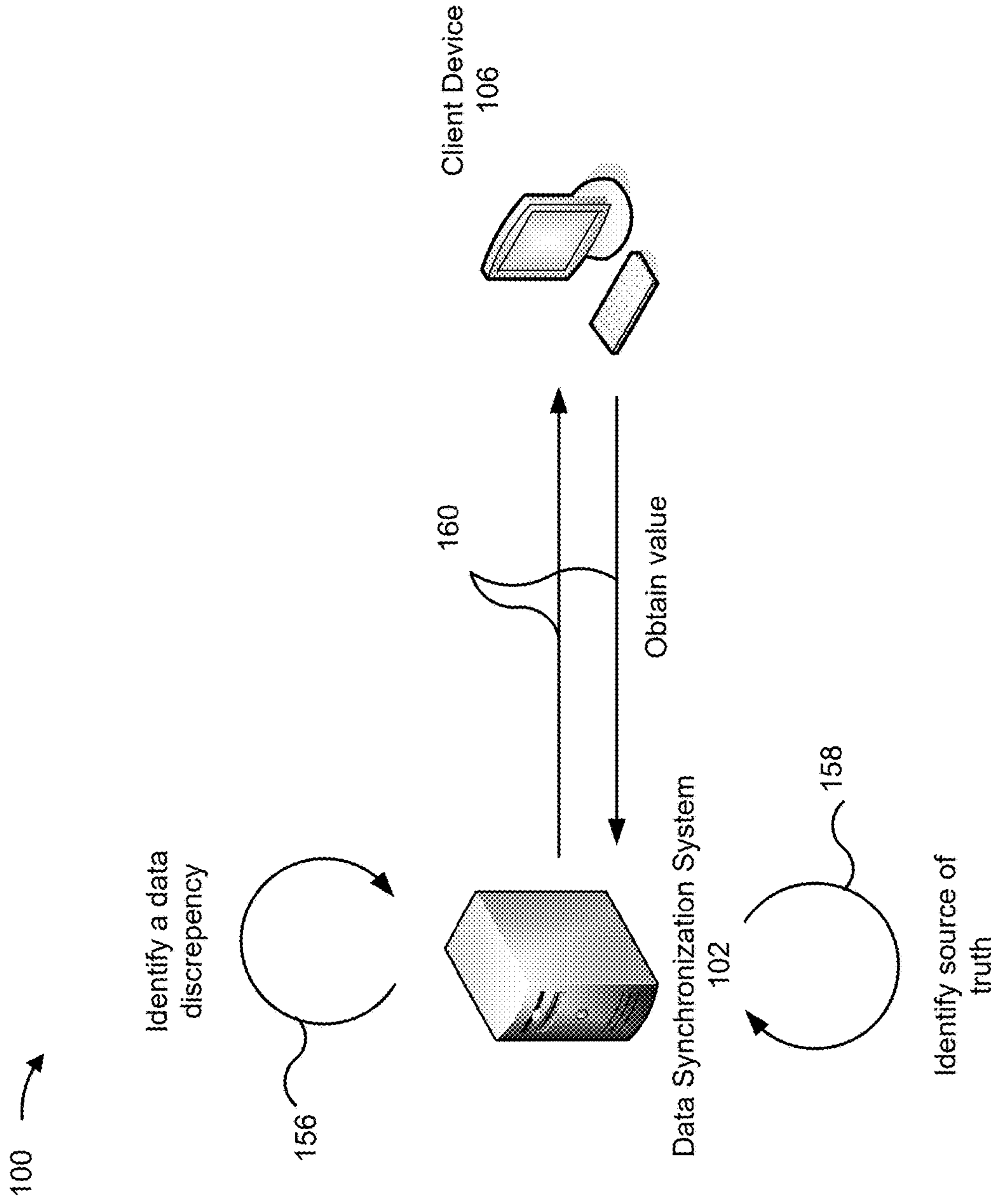
Figure 1C:
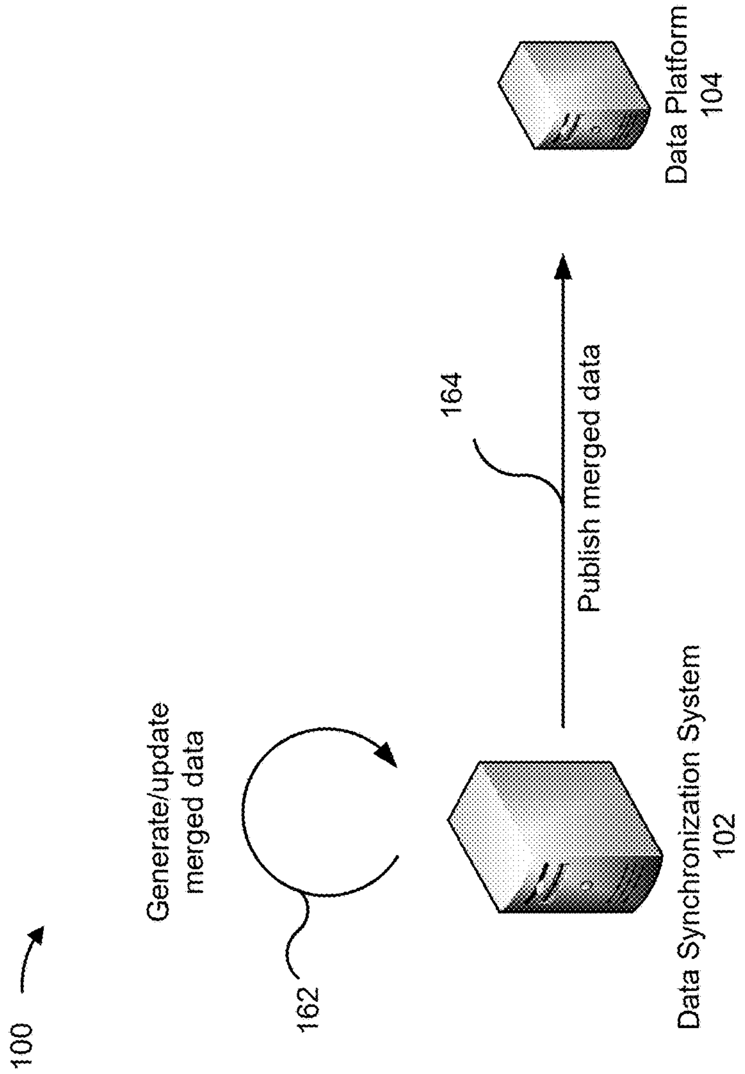

FIGS. 1A-1C are diagrams of an example implementation 100 associated with data synchronization across platforms. As shown in FIGS. 1A-1C, example implementation 100 includes a data synchronization system 102, a data platform 104, and a client device 106. These devices are described in more detail below in connection with FIG. 2 and FIG. 3.

As further shown in FIG. 1A, and by reference number 150, the data synchronization system 102 may detect a data synchronization event. For example, the data synchronization system 102 may receive an indication of the data synchronization event from the client device 106. In this case, the data synchronization event may include a request, from the client device 106, to synchronize data across a set of data structures. Additionally, or alternatively, the data synchronization event may include an incident for which data is requested. For example, the data synchronization system 102 may receive, from the client device 106, a request for data that is associated with a resolution of an incident. In this case, the data synchronization system 102 may generate a merged dataset to enable one or more tasks to be completed in connection with the resolution of the incident.

Additionally, or alternatively, the data synchronization system 102 may determine that a data synchronization event has occurred based on determining an availability of a data set. For example, when a new data platform 104 is onboarded to a system (e.g., an enterprise system for an organization), the data synchronization system 102 may detect a presence of the new data platform 104 and may trigger the data synchronization event to merge one or more new datasets of the new data platform 104 with one or more existing datasets of one or more existing data platforms 104. Additionally, or alternatively, the data synchronization system 102 may determine a data synchronization event when system data changes. For example, when the data synchronization system 102 detects a change to a set of services, applications, or systems (or a change to a data structure thereof) associated with a common computing platform, the data synchronization system 102 may trigger a data synchronization event to merge or re-merge a group of datasets into a single merged dataset. Additionally, or alternatively, the data synchronization system 102 may determine a data synchronization event based on a presence of a new application. For example, when a new data platform is incorporated into a cloud environment that supports the data synchronization system 102, the data synchronization system 102 may determine that a data event has occurred.

As further shown in FIG. 1A, and by reference number 152, the data synchronization system 102 may fetch data from a set of data platforms 104. For example, the data synchronization system 102 may request and receive one or more data structures from a set of data platforms 104-1 through 104-N. In some implementations, the data synchronization system 102 may fetch data from different types of data platforms 104. For example, the data synchronization system 102 may identify a set of services, applications, or systems associated with a computing platform and may identify different types of data platforms 104 associated with the set of services, applications, or systems. Different types of data platforms 104 may include relational databases, structured query language (SQL) databases, non-SQL databases, data warehouses, data lakes, search or indexing platforms, time-series databases, graph databases, file storage systems, message brokers or event streaming platforms, object storage platforms, data integration platforms, cache systems, data governance and metadata management platforms, business intelligence and analytics platforms, or distributed computing and analytics platforms, among other examples of data structures or data sources.

As further shown in FIG. 1A, and by reference number 154, the data synchronization system 102 may cross-correlate and merge data. For example, the data synchronization system 102 may generate a merged dataset based on multiple component datasets obtained from the set of data platforms 104. In some implementations, the data synchronization system 102 may determine a set of characteristics of an entity for which data entries are to be identified. For example, the data synchronization system 102 may identify an application to be provided by a system (e.g., an entity) and may identify a set of characteristics of parameters associated with the application, such as a set of application resources, an application team lead (e.g., a client device associated with the application team lead), an application team manager (e.g., a client device associated with the application team manager), a set of on-call personnel for the application (e.g., a set of client devices associated with the set of on-call personnel), an escalation policy for the application, or a set of automated tasks to perform in connection with an issue with the application.

In some implementations, the data synchronization system 102 may use a matching technique to cross-correlate and merge the data. For example, for each component dataset, the data synchronization system 102 may identify a set of fields and may determine that one or more other datasets have one or more of the same fields. In this case, when a first field is determined to be present in multiple component datasets, the data synchronization system 102 may identify other related fields to merge from the multiple component datasets. For example, when a first component dataset includes an application identifier field and an escalation policy field, and a second component dataset includes the application identifier field and an on-call personnel identifier field, the data synchronization system 102 may identify a match between the respective application identifier fields. In this case, for values that match (e.g., the same application identifier present in both datasets), the data synchronization system 102 may merge the related fields to generate a merged dataset that includes an application identifier field and related escalation policy and on-call personnel identifier fields. In this case, the escalation policy field and the on-call personnel identifier field are associated with each other based on a common value in the application identifier field across respective component datasets.

In some implementations, the data synchronization system 102 may use relationship information in a dataset to merge values. For example, a dataset may include relationship information identifying which fields are related and the data synchronization system 102 may use the relationship information to determine which fields to associate with each other when matching a field across datasets. Additionally, or alternatively, the data synchronization system 102 may predict a relationship. For example, the data synchronization system 102 may analyze a first data entry and a second data entry using a machine learning or artificial intelligence model to predict a likelihood that the first data entry and second data entry are related. In this case, based on the likelihood satisfying a threshold, the data synchronization system 102 may cross-correlate the first data entry and the second data entry.

In some implementations, the data synchronization system 102 may use a fuzzy matching technique to cross-correlate and merge the data. For example, the data synchronization system 102 may use an artificial intelligence or machine learning technique to identify fuzzy matches, which may include similar or partially matching elements, fields, or values across different datasets. In this case, the data synchronization system 102 may use a model to determine a likelihood of a pair of elements, fields, or values matching and may classify the pair as a match based on the likelihood satisfying a threshold. In this way, the data synchronization system 102 may account for data inconsistencies, typographical errors, differing descriptions of common items across different datasets (e.g., an application being referred to in a first manner in a first dataset and in a second, different manner in a second dataset).

As shown in FIG. 1B, and by reference number 156, the data synchronization system 102 may identify a data discrepancy. For example, the data synchronization system 102 may determine that a cross-correlated data entry includes multiple different values in multiple different source data structures. In some implementations, the data synchronization system 102 may identify a data discrepancy based on a prediction. For example, the data synchronization system 102 may use an artificial intelligence or neural network technique to evaluate whether two differing values for the same field are matches or not matches. In this case, the data synchronization system 102 may determine that the two values are matches when the two values are the same or have a threshold similarity (e.g., at least a threshold likelihood of representing the same value, such as having a different quantity of decimal places for a numerical value, having different spellings of the same word for a textual value, or having different types of identifiers for the same application).

In contrast, the data synchronization system 102 may determine that two values are not matches when the two values are not the same and do not have a threshold similarity. In some implementations, the data synchronization system 102 may identify a data discrepancy based on a missing value. For example, the data synchronization system 102 may determine that, for a set of fields associated with a particular entity, one or more values are missing in the set of fields. In other words, when a set of fields are associated with an application, the data synchronization system 102 may determine that there are values for the application field, a manager field, and an escalation policy field, but that an associated on-call personnel identifier field does not have a value.

As further shown in FIG. 1B, and by reference number 158, the data synchronization system 102 may identify a source of truth for the data discrepancy. For example, the data synchronization system 102 may determine whether a first value of the data entry in a particular source data structure is authoritative over a second value of the data entry. In some implementations, the data synchronization system 102 may identify a source of truth for the data discrepancy based on a prioritization of datasets. For example, the data synchronization system 102 may receive information identifying a prioritization of datasets, which indicates which datasets are to take priority over which other datasets in terms of resolving discrepancies. Additionally, or alternatively, the data synchronization system 102 may generate a prioritization of datasets. For example, the data synchronization system 102 may use an artificial intelligence or machine learning algorithm to assess a reliability of each dataset based on one or more factors, such as a completeness of a dataset, a quantity of errors found in values of a dataset relative to each other dataset, a source of a dataset, a time at which a dataset was generated, or another factor. In this case, based on generating the prioritization of datasets, the data synchronization system 102 may prioritize values from higher priority datasets relative to values from lower priority datasets when resolving discrepancies.

Additionally, or alternatively, the data synchronization system 102 may identify a source of truth external to a dataset or component dataset. For example, the data synchronization system 102 may identify a client device to which to transmit a message requesting an identification of a value to resolve a data discrepancy. In this case, the data synchronization system 102 may identify the client device based on a dataset. For example, a dataset may include a value identifying a client device or user thereof to contact to resolve a discrepancy that involves a field or value of the dataset. Additionally, or alternatively, the dataset may identify one or more users associated with a set of fields in a dataset. For example, when a set of associated fields identifies a client device or user thereof in a value of a field, but there is a data discrepancy with another value in another field of the set of associated fields, the data synchronization system 102 may identify the client device or user thereof as a source of truth for resolving the data discrepancy with the other value in the other field.

Additionally, or alternatively, the data synchronization system 102 may store information identifying one or more client devices or users thereof that are to be sources of truth for resolving data discrepancies. For example, when the data synchronization system 102 receives a request for data synchronization from the client device 106, the data synchronization system 102 may store information identifying the client device 106 as a source of truth for resolving data discrepancies. Additionally, or alternatively, the data synchronization system 102 may receive information, from the client device 106, identifying one or more other client devices or users thereof to use as a source of truth for resolving data discrepancies.

As further shown in FIG. 1B, and by reference number 160, the data synchronization system 102 may obtain a value to resolve the data discrepancy. For example, the data synchronization system 102 may communicate with a client device 106 to obtain a value to resolve the data discrepancy. In some implementations, the data synchronization system 102 may transmit information identifying the data discrepancy via a particular communication channel. For example, the data synchronization system 102 may transmit an alert notification, a short message service (SMS) message, an email message, a push message, or another type of message to the client device 106 to request a value (or a selection of a value) to resolve a data discrepancy. Additionally, or alternatively, the data synchronization system 102 may select from a set of possible values. For example, when the data synchronization system 102 identifies a mismatch between two possible values for a field, the data synchronization system 102 may select a possible value based on, for example, a prioritization of a dataset from which the possible value is obtained, as described above. Additionally, or alternatively, the data synchronization system 102 may generate a value. For example, the data synchronization system 102 may use a mathematical technique to generate a value from one or more possible values, such as an averaging or statistical selection technique. Additionally, or alternatively, the data synchronization system 102 may use an artificial intelligence, neural network, or large language model (LLM) technique to generate a value for a field from one or more possible values or from other contextual data (e.g., other values from other associated fields or other values from the same field in other contexts).

As shown in FIG. 1C, and by reference number 162, the data synchronization system 102 may generate or update merged data. For example, based on resolving the data discrepancy with a value that is to be considered authoritative for a data entry, the data synchronization system 102 may update the data entry in a merged data structure to include the value. In some implementations, the data synchronization system 102 may include a selected value in the merged dataset based on identifying a source of truth and obtaining a value or a selection of a from the source of truth. Additionally, or alternatively, the data synchronization system 102 may include a generated value based on generating a value.

As further shown in FIG. 1C, and by reference number 164, the data synchronization system 102 may publish the merged data. For example, the data synchronization system 102 may cause the merged data structure to be available, via a data platform 104, for calls by one or more systems, applications, or user devices of a computing platform, such as an enterprise computing platform. In some implementations, the data synchronization system 102 may update one or more dependencies to cause the merged data structure and/or a merged dataset thereof to be available via an application programming interface or another type of request command. In some implementations, by publishing the merged data structure and/or a merged dataset thereof, different applications or services associated with different component datasets can call information from the merged dataset, thereby reducing a likelihood of errors associated with using the component datasets.

In some implementations, the data synchronization system 102 or a platform associated therewith may automatically resolve or manage incidents using the merged data structure and/or a merged dataset thereof. For example, the data synchronization system 102 may identify an incident and use one or more values in the merged dataset to perform one or more actions associated with resolving the incident. As a particular example, the data synchronization system 102 may identify an unavailable application, identify an incident management policy in the merged dataset, alert one or more application managers identified in the merged dataset, transmit a set of messages to a set of on-call personnel identified in the merged dataset to trigger one or more changes to the application, detect or receive information identifying one or more changes to the application, and transmit one or more alerts to one or more user devices identified in the merged dataset to indicate that the application has become available, among other example actions.

In some implementations, the data synchronization system 102 may generate log data and store the log data in a log data structure. For example, the data synchronization system 102 may generate log data identifying one or more alerts or errors. In this case, the one or more errors or alerts may include information associated with data discrepancies. Additionally, or alternatively, the one or more errors or alerts may include information associated with usage of the merged dataset. In some implementations, the data synchronization system 102 may use the log data to train a machine learning or artificial intelligence model for data cross-correlation or data discrepancy identification.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
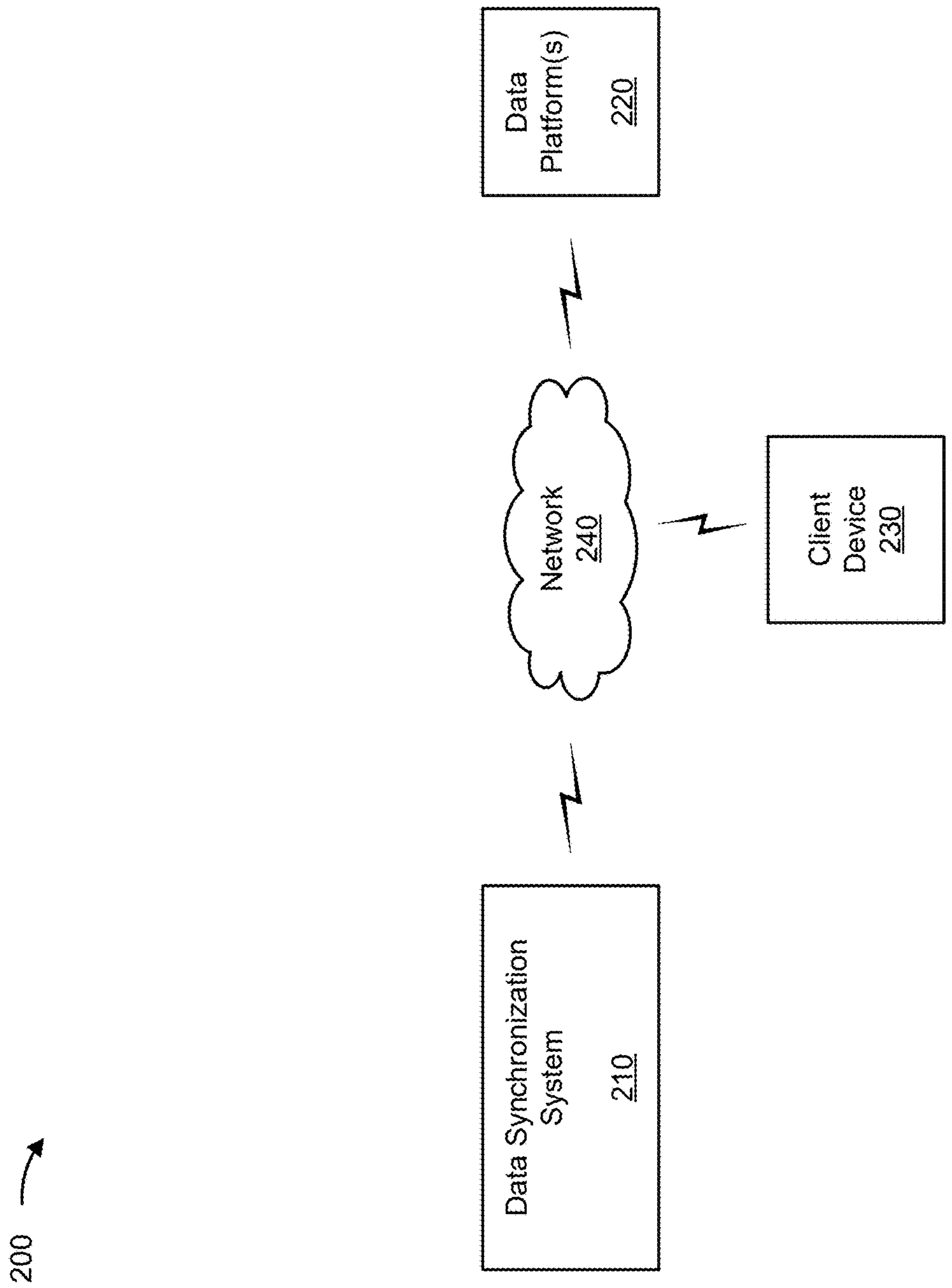
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a data synchronization system 210, a set of data platforms 220, a client device 230, and a network 240. Devices of environment 200 may interconnect via wired connections, wireless connections, or a combination of wired and wireless connections.

The data synchronization system 210 may include one or more devices capable of receiving, generating, storing, processing, providing, and/or routing information associated with merging datasets, as described elsewhere herein. The data synchronization system 210 may include a communication device and/or a computing device. For example, the data synchronization system 210 may include a server, such as an application server, a client server, a web server, a database server, a host server, a proxy server, a virtual server (e.g., executing on computing hardware), or a server in a cloud computing system. In some implementations, the data synchronization system 210 may include computing hardware used in a cloud computing environment.

The data platform 220 may include one or more devices capable of receiving, generating, storing, processing, and/or providing information associated with a group of datasets that can be accessed by applications or systems, as described elsewhere herein. The data platform 220 may include a communication device and/or a computing device. For example, the data platform 220 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the data platform 220 may store one or more datasets, as described elsewhere herein.

The client device 230 may include one or more devices capable of receiving, generating, storing, processing, and/or providing information associated with synchronizing data across platforms, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
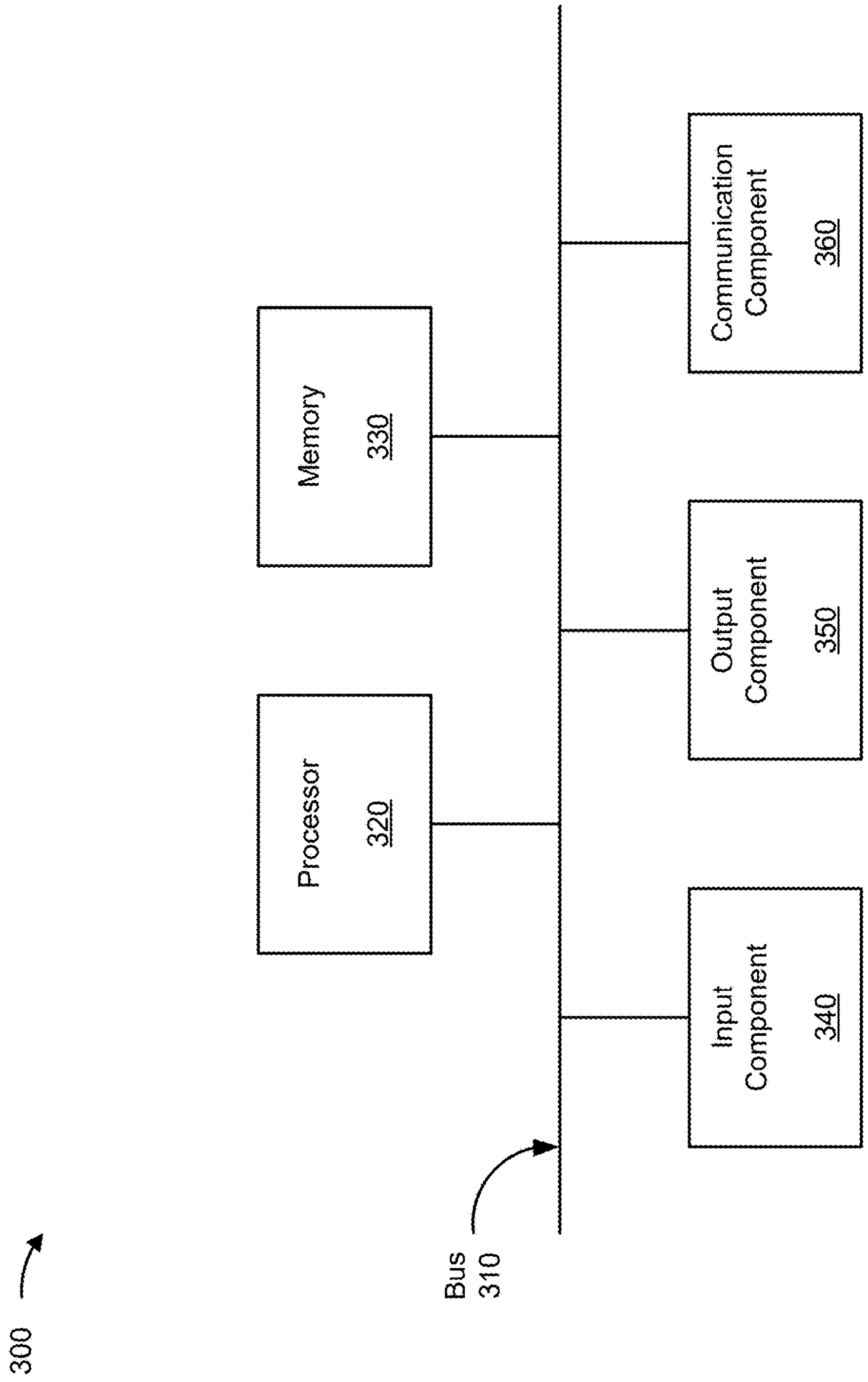
FIG. 3 is a diagram of example components of a device associated with data synchronization across platforms, in accordance with some embodiments of the present disclosure.

FIG. 3 is a diagram of example components of a device 300 associated with data synchronization across platforms. The device 300 may correspond to the data synchronization system 210, the data platforms 220, or the client device 230. In some implementations, the data synchronization system 210, the data platforms 220, or the client device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
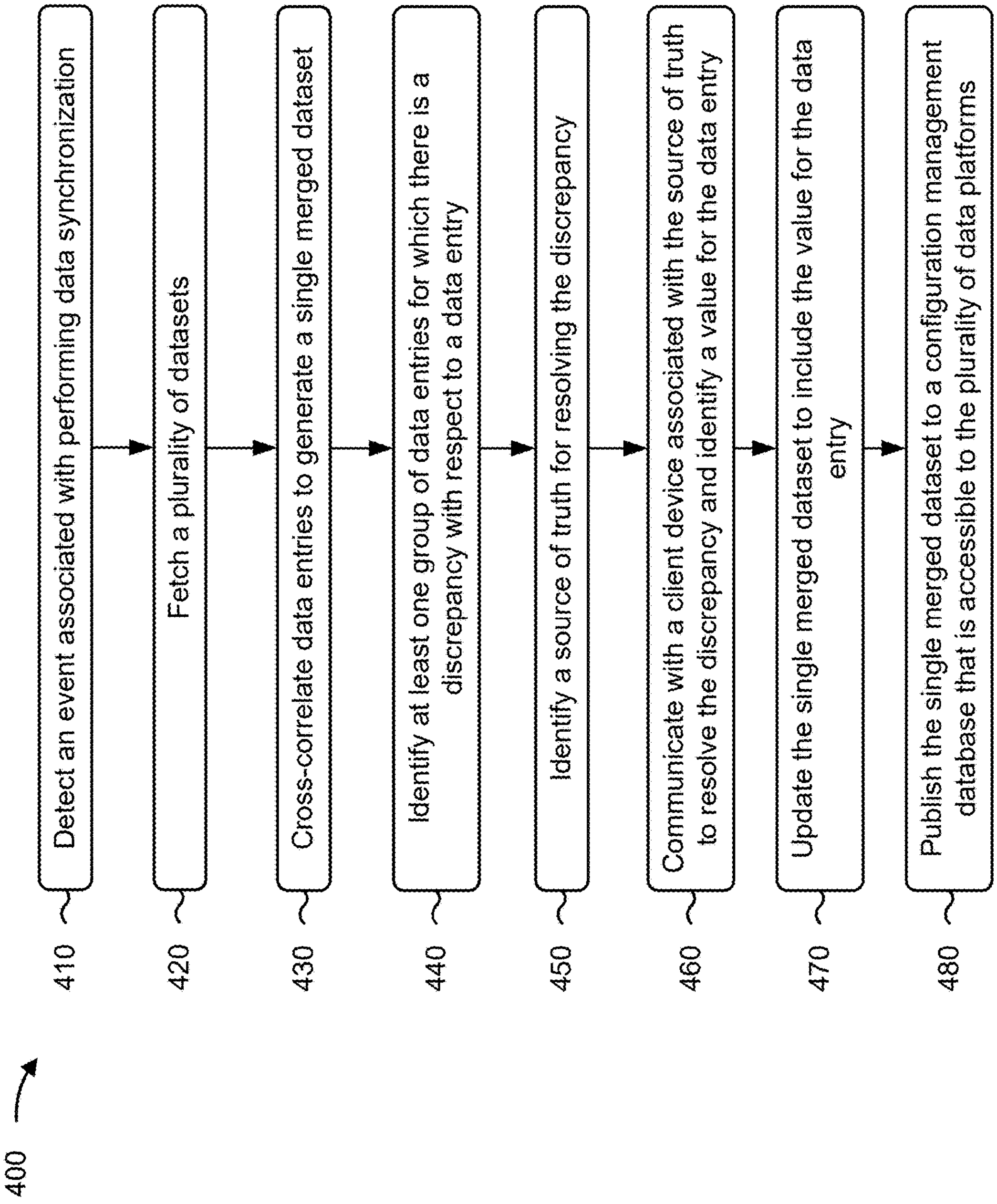
FIG. 4 is a flowchart of an example process associated with data synchronization across platforms, in accordance with some embodiments of the present disclosure.

FIG. 4 is a flowchart of an example process 400 associated with data synchronization across platforms. In some implementations, one or more process blocks of FIG. 4 may be performed by the data synchronization system 210. In some implementations, one or more process blocks of FIG. 4 may be performed by another device or a group of devices separate from or including the data synchronization system 210, such as the data platforms 220 or the client device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include detecting an event associated with performing data synchronization (block 410). For example, the data synchronization system 210 (e.g., using processor 320 and/or memory 330) may detect an event associated with performing data synchronization, as described above in connection with reference number 150 of FIG. 1A. As an example, the data synchronization system 210 may detect a presence of a new dataset that is to be merged with a group of existing datasets.

As further shown in FIG. 4, process 400 may include fetching a plurality of datasets, each dataset having a plurality of data entries (block 420). For example, the data synchronization system 210 (e.g., using processor 320 and/or memory 330) may fetch, from a plurality of data platforms, a plurality of datasets, each dataset having a plurality of data entries, as described above in connection with reference number 152 of FIG. 1A. As an example, the data synchronization system 210 may communicate with a group of data platforms to request and receive data entries from datasets stored by the group of data platforms.

As further shown in FIG. 4, process 400 may include crossing-correlating data entries to generate a single merged dataset (block 430). For example, the data synchronization system 210 (e.g., using processor 320 and/or memory 330) may cross-correlate data entries, from the plurality of datasets, to generate a single merged dataset, as described above in connection with reference number 154 of FIG. 1A. As an example, the data synchronization system 210 may identify data entries that match each other in multiple datasets and may associate other related data entries from each dataset based on the data entries matching each other in multiple datasets.

As further shown in FIG. 4, process 400 may include identifying at least one group of data entries for which there is a discrepancy with respect to a data entry (block 440). For example, the data synchronization system 210 (e.g., using processor 320 and/or memory 330) may identify at least one group of data entries, of the single merged dataset, for which there is a discrepancy with respect to a data entry, as described above in connection with reference number 156 of FIG. 1B. As an example, the data synchronization system 210 may determine that two data entries, that are to be associated with each other based on other corresponding data entries, have conflicting values, such as a common device name (the corresponding data entries) being associated with two different network addresses (the conflicting values).

As further shown in FIG. 4, process 400 may include identifying a source of truth for resolving the discrepancy (block 450). For example, the data synchronization system 210 (e.g., using processor 320 and/or memory 330) may identify, based on other data entries within the at least one group of data entries, a source of truth for resolving the discrepancy, as described above in connection with reference number 158 of FIG. 1B. As an example, the data synchronization system 210 may determine which data platform (or other data source) is to be considered as having an authoritative value for the data entries with the conflicting values.

As further shown in FIG. 4, process 400 may include communicating with a client device associated with the source of truth to resolve the discrepancy and identify a value for the data entry (block 460). For example, the data synchronization system 210 (e.g., using processor 320 and/or memory 330) may communicate with a client device associated with the source of truth to resolve the discrepancy and identify a value for the data entry, as described above in connection with reference number 160 of FIG. 1B. As an example, the data synchronization system 210 may determine that a particular user is a source of truth for a conflict and may request and receive a user response via a client device to select an authoritative value for a data entry for which there are conflicting values.

As further shown in FIG. 4, process 400 may include updating the single merged dataset to include the value for the data entry (block 470). For example, the data synchronization system 210 (e.g., using processor 320 and/or memory 330) may update the single merged dataset to include the value for the data entry, as described above in connection with reference number 162 of FIG. 1C. As an example, the data synchronization system 210 may generate or update a merged dataset with the authoritative value used for the data entry for which there are conflicting values.

As further shown in FIG. 4, process 400 may include publishing the single merged dataset to a configuration management database that is accessible to the plurality of data platforms (block 480). For example, the data synchronization system 210 (e.g., using processor 320 and/or memory 330) may publish the single merged dataset to a configuration management database that is accessible to the plurality of data platforms, as described above in connection with reference number 164 of FIG. 1C. As an example, the data synchronization system 210 may cause the merged dataset to be available to each data platform such that when a request is received for data, each data platform can pull data entries from the merged dataset to fulfill the request.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data synchronization, the system comprising:

one or more memories; and one or more processors, communicatively coupled to the one or more memories, configured to:

detect an event associated with performing data synchronization;

fetch, from a plurality of data platforms, a plurality of datasets including one or more of configuration information, management information, or incident response information relating to enterprise applications or systems, each dataset of the plurality of datasets having a plurality of data entries;

cross-correlate and merge data entries, from the plurality of datasets, including mapping between disparate data structures and schemas, to generate a merged dataset comprising correlated entries from at least two of configuration information, management information, and incident response information;

identify at least one group of data entries, of the merged dataset, for which there is a discrepancy with respect to a data entry;

identify, based on other data entries within the at least one group of data entries, a source of truth for resolving the discrepancy;

communicate with a client device associated with the source of truth to resolve the discrepancy and identify a value for the data entry;

update the merged dataset to include the value for the data entry; and publish the merged dataset to a configuration management database that is accessible to the plurality of data platforms, wherein information from the merged dataset is made available, by the configuration management database, to be called by one or more applications or services associated with different component datasets.

2. The system of claim 1, wherein the plurality of datasets further includes a dataset with relationship information; and wherein the one or more processors, to cross-correlate the data entries, are to:

cross-correlate the data entries using the relationship information.

3. The system of claim 1, wherein the one or more processors are to:

analyze a first data entry and a second data entry using a machine learning model to predict a likelihood of a relationship between the first data entry and the second data entry; and wherein the one or more processors, to cross-correlate the data entries, are to:

cross-correlate the first data entry and the second data entry based on the likelihood of the relationship between the first data entry and the second data entry.

4. The system of claim 1, wherein the one or more processors, to identify the source of truth, are to:

identify a prioritization of the plurality of datasets; and identify the source of truth based on the prioritization of the plurality of datasets.

5. The system of claim 1, wherein the one or more processors, to communicate with the client device, are configured to:

transmit a first message identifying the discrepancy with the data entry; and receive a response indicating a resolution to the discrepancy with the data entry.

6. The system of claim 1, wherein the one or more processors, to detect the event, are to:

detect a presence of a new application associated with a new data platform being incorporated into a cloud environment that supports the plurality of data platforms.

7. The system of claim 1, wherein the one or more processors, to detect the event, are to:

receive information identifying a change to one or more data entries of the plurality of datasets.

8. The system of claim 1, wherein the one or more processors, to detect the event, are to:

receive a request from an application associated with the plurality of data platforms.

9. The system of claim 1, wherein the one or more processors, to detect the event, are to:

determine that a configured period of time has elapsed from a last synchronization of the plurality of datasets.

10. The system of claim 1, wherein the one or more processors are further configured to:

log one or more errors or alerts in a log data structure.

11. A non-transitory computer-readable medium storing a set of instructions, the set of instructions comprising:

one or more instructions that, when executed by one or more processors of a system, cause the system to:

detect an event associated with performing data synchronization;

fetch, from a plurality of data platforms, a plurality of datasets, each dataset of the plurality of datasets having a plurality of data entries including one or more of configuration information, management information, or incident response information relating to enterprise applications or systems;

merge data entries, from the plurality of datasets, including mapping between disparate data structures and schemas, to generate a merged dataset comprising correlated entries from at least two of configuration information, management information, and incident information;

identify at least one group of data entries, of the merged dataset, for which there is a discrepancy with respect to a data entry;

predict a value for the data entry based on the merged dataset;

update the merged dataset to include the value for the data entry; and publish the merged dataset to a configuration management database that is accessible to the plurality of data platforms, wherein information from the merged dataset is made available, by the configuration management database, to be called by one or more applications or services associated with different component datasets.

12. The non-transitory computer-readable medium of claim 11, wherein the one or more instructions, that cause the system to predict the value for the data entry, cause the system to:

train an artificial intelligence model of data cross-correlation; and execute the artificial intelligence model to predict the value for the data entry.

13. The non-transitory computer-readable medium of claim 11, wherein the one or more instructions further cause the system to:

analyze a first data entry and a second data entry using a machine learning model to predict a likelihood of a relationship between the first data entry and the second data entry; and wherein the one or more instructions, that cause the system to merge the data entries, cause the system to:

cross-correlate the first data entry and the second data entry based on the likelihood of the relationship between the first data entry and the second data entry.

14. The non-transitory computer-readable medium of claim 11, wherein the one or more instructions, that cause the system to detect the event, cause the system to:

detect a presence of a new application associated with a new data platform being incorporated into a cloud environment that supports the plurality of data platforms.

15. The non-transitory computer-readable medium of claim 11, wherein the one or more instructions, that cause the system to detect the event, cause the system to:

receive information identifying a change to one or more data entries of the plurality of datasets.

16. The non-transitory computer-readable medium of claim 11, wherein the one or more instructions further cause the system to:

log one or more errors or alerts in a log data structure.

17. A method, comprising:

detecting, by a device, an event associated with performing data synchronization;

fetching, by the device and from a plurality of data platforms, a plurality of datasets including one or more of configuration information, management information, or incident response information relating to enterprise applications or systems, each dataset of the plurality of datasets having a plurality of data entries;

cross-correlating and merging, by the device, data entries, from the plurality of datasets, including mapping between disparate data structures and schemas to generate a-single merged dataset comprising correlated entries from at least two of configuration information, management information, and incident response information;

identifying, by the device, at least one group of data entries, of the merged dataset, for which there is a discrepancy with respect to a data entry;

identifying, by the device and based on other data entries within the at least one group of data entries, a source of truth for resolving the discrepancy;

resolving, by the device and using the source of truth, the discrepancy and identify a value for the data entry;

updating, by the device, the merged dataset to include the value for the data entry; and publishing, by the device, the merged dataset to a configuration management database that is accessible to the plurality of data platforms, wherein information from the merged dataset is made available, by the configuration management database, to be called by one or more applications or services associated with different component datasets.

18. The method of claim 17, wherein identifying the source of truth comprises:

identifying a prioritization of the plurality of datasets; and identifying the source of truth based on the prioritization of the plurality of datasets.

19. The method of claim 17, wherein resolving the discrepancy comprises:

transmitting a first message identifying the discrepancy with the data entry; and receiving a response indicating a resolution to the discrepancy with the data entry.

20. The method of claim 17, further comprising:

logging one or more errors or alerts in a log data structure.

* * * * *